United States Patent
Lambert

(10) Patent No.: US 10,048,130 B2
(45) Date of Patent: Aug. 14, 2018

(54) CONTEXT IMAGING RAMAN SPECTROMETER

(71) Applicant: CALIFORNIA INSTITUTE OF TECHNOLOGY, Pasadena, CA (US)

(72) Inventor: James L. Lambert, Pasadena, CA (US)

(73) Assignee: CALIFORNIA INSTITUTE OF TECHNOLOGY, Pasadena, CA (US)

(*) Notice: Subject to any disclaimer, the term of this patent is extended or adjusted under 35 U.S.C. 154(b) by 295 days.

(21) Appl. No.: 14/989,749

(22) Filed: Jan. 6, 2016

(65) Prior Publication Data

US 2016/0202124 A1 Jul. 14, 2016

Related U.S. Application Data

(60) Provisional application No. 62/101,457, filed on Jan. 9, 2015.

(51) Int. Cl.
| | |
|---|---|
| G01J 3/44 | (2006.01) |
| G01J 3/28 | (2006.01) |
| G01J 3/10 | (2006.01) |
| G01J 3/02 | (2006.01) |

(52) U.S. Cl.
CPC ............... *G01J 3/44* (2013.01); *G01J 3/027* (2013.01); *G01J 3/0208* (2013.01); *G01J 3/0218* (2013.01); *G01J 3/10* (2013.01); *G01J 3/108* (2013.01); *G01J 3/2823* (2013.01); *G01J 2003/102* (2013.01); *G01J 2003/104* (2013.01)

(58) Field of Classification Search
CPC .......... G01N 21/65; G01N 21/658; G01J 3/44
See application file for complete search history.

(56) References Cited

U.S. PATENT DOCUMENTS

| | | | | |
|---|---|---|---|---|
| 3,983,507 | A * | 9/1976 | Tang | G01N 21/39 359/247 |
| 4,405,237 | A * | 9/1983 | Manuccia | G01J 3/44 356/301 |
| 5,257,085 | A * | 10/1993 | Ulich | G01J 3/2823 348/31 |
| 6,069,689 | A * | 5/2000 | Zeng | A61B 5/0059 356/301 |
| 2005/0030533 | A1* | 2/2005 | Treado | G01J 3/02 356/326 |
| 2006/0197947 | A1* | 9/2006 | Wang | G01J 3/28 356/301 |

(Continued)

OTHER PUBLICATIONS

Shreve, Andrew P., Nerine J. Cherepy, and Richard A. Mathies. "Effective rejection of fluorescence interference in Raman spectroscopy using a shifted excitation difference technique." Applied spectroscopy 46.4 (1992): 707-711.*

(Continued)

*Primary Examiner* — Tri Ton
*Assistant Examiner* — Rufus Phillips
(74) *Attorney, Agent, or Firm* — Steinfl + Bruno LLP

(57) ABSTRACT

Methods and systems for Raman spectroscopy and context imaging are disclosed. One or two lasers can be used to excite Raman scattering in a sample, while a plurality of LEDs can illuminate the sample at a different wavelength. The LED light is collected by a lenslet array in order to enable a high depth of field. Focusing of the image can be carried out at specific points of the image by processing the light collected by the lenslet array.

17 Claims, 9 Drawing Sheets

(56) References Cited

U.S. PATENT DOCUMENTS

| | | | |
|---|---|---|---|
| 2008/0062417 A1* | 3/2008 | Stave | G01J 3/44 356/301 |
| 2008/0266655 A1* | 10/2008 | Levoy | G02B 21/361 359/368 |
| 2014/0296668 A1* | 10/2014 | Sato | G01J 3/0202 600/317 |

OTHER PUBLICATIONS

Adelson, T. et al. "Single lens stereo with a plenoptic camera". IEEE Transactions on Pattern Analysis and Machine Intelligence vol. 14, No. 2, pp. 99-106. 1992.
Agard, D.A. "Optical Sectioning Microscopy: Cellular Architecture in Three Dimensions", Ann Rev. Biophys. Bioeng. 13, 191-219. 1984.
Andersen, A.H. et al. "Simultaneous algebraic reconstruction technique (SART): A superior implementation of the ART algorithm", Ultrasonic Imaging 6, 1984, pp. 81-94.
Anthon, D.W. et al. "Intracavity doubling of CW diode pumped Nd:YAG lasers with KTP", IEEE J. Quantum Elect. 28, 1148-1157 (1992).
Antonczak, A. et al. "Single-frequency microchip solid state diode pumped lasers", Bulletin of the Polish Academy of Sciences: Technical Sciences; vol. 56; No. 2. pp. 113-116 (2008).
Arns, J. A., "Holographic transmission grating improve spectroscopy and ultrafast laser performance", SPIE Proc., 2404, pp. 174-181, 1995.
Arridge, S.R. "Methods for the Inverse Problem in Optical Tomography", Proc. Waves and Imaging Through Complex Media, Kluwer, 2001; pp. 307-329.
Baer, T. "Large—amplitude fluctuations due to longitudinal mode coupling in diode-pumped intracavity— doubled Nd:YAG lasers", J. Opt. Soc. Am. vol. 3, No. 9; pp. 1175-1180 (1986).
Battey, D. E., et al. "Axial transmissive f/1.8 imaging Raman spectrograph with Volume-phase holographic filter and grating", Appl. Spectrosc., 47, 1913-1919, 1993.
Bell, J. F. III, et al., "Minerologic and compositional properties of Martian soil and dust: Results from Mars Pathfinder", J. Geophys. Res., 105, 1721-1755, 2000.
Bell, J. F., III, "Iron, sulfate, carbonate, and hydrated minerals on Mars", Mineral Spectroscopy: A Tribute to Roger G. Burns, Geochem. Soc. Spec. Publ., vol. 5, pp. 359-380, 1996.
Chamgoulov, R.O. et al. "Optical computed-tomography microscope using digital spatial light modulation", Proc. SPIE 5324, pp. 182-190. 2004.
Chen, Y.F. et al. "Compact and efficient 3.2—Wdiode—pumped Nd:YVO4yKTP green laser", Appl. Optics 37, 5727-5730 (1998).
Christensen, P. R., et al. "Mars Global Surveyor Thermal Emission Spectrometer experiment: Investigation description and surface science results" J. Geophys. Res., vol. 106; No. E10; pp. 23,823,871, Oct. 25, 2001.
Clark, B. C. et al. "The salts of Mars", Icarus, 45, pp. 370-378, Oct. 28, 1980.
Colsher, J.G. 1980. Fully three-dimensional positron emission tomography, Phys. Med. Biol. vol. 25; No. 1; 1980; pp. 103-115.
Cooney, T. F. et al. "Vibrational spectroscopic study of minerals in the Martian meteorite ALH84001", Am. Mineral., 84, 1569-1576, 1999.
Cooper J, et al. "Sequentially shifted Raman spectroscopy: Novel algorithm and instrumentation for fluorescence-free Raman spectroscopy in spectral space", Applied Spectroscopy vol. 67; No. 8, pp. 973-984; 2013.
Dhamelincourt, P. et al. "Raman microscopy, in Handbook of Microscopy", John Wiley, New York, 1997. p. 54.
Dickensheets, D. et al. "A novel miniature confocal microscope/ Raman spectrometer system for biomolecular analysis on future Mars missions after Antarctic trials", J. Raman Spectrosc., 31, 633-635, 2000.

Edwards, H. et al. "Comparative Raman spectroscopy of a Martian meteorite and Antarctic lithic analogues", Planet. Space Sci., 47, 1999. pp. 353-362.
Ellis, G.W. 1966. Holomicrography: transformation of image during reconstruction a posteriori, Science 143, pp. 1195-1196.
Exobiology Program Office, NASA HQ, "An exobiological strategy for Mars exploration", NASA Spec. Pap. SP, 530, 1995. 65 pages.
Fagan, T. J., et al. "Formation of feldspathic, metallic, and enstatitic melts by shock in enstatite chondrite Reckling Peak A80259", Meteorit. Planet. Sci., vol. 35, pp. 319-329, 2000.
Fonti, S. et al. "Presence and detection of carbonates on the Martian surface", Journal of Geophysical Research; vol. 106; No. E11; pp. 27, 815-822. Nov. 25, 2001.
Friel G.J. et al. "Compact and efficient Nd:YVO4 laser that generates a tunable single frequency green output", Appl. Optics 39, pp. 4333-4337 (2000).
Gabor, D. "A New Microscopic Principle", Nature 161, May 15, 1948 pp. 777-778.
Goodman, J. 1996. Introduction to Fourier optics, 2nd edition, McGraw-Hill. 457 pages.
Gustafsson, M.G.L. "Nonlinear structured-illumination microscopy: Wide-field fluorescence imaging with theoretically unlimited resolution", Proc. National Academy of Sciences vol. 102; No. 37; pp. 13081-13086; Sep. 13, 2005.
Hargraves, R. et al. "Magnetic enhancement on the surface of Mars?" Journal of Geophysical Research; vol. 105; No. E1; pp. 1819-1827; Jan. 25, 2000.
Haskin, L. A. et al. "Raman spectroscopy for mineral identification and quantification for in-situ planetary surface analysis: A point count method", Journal of Geophysical Research; vol. 102, No. E8; pp. 19,293-19,306, Aug. 25, 1997.
Holmes, T.J., et al. "Light microscopic images reconstructed by maximum likelihood deconvolution", In Handbook of Biological Confocal Microscopy, ed. J.B. Pawley, Plenum Press, pp. 389-402. 1995.
Inoue, S., et al. "Microscopes", In Handbook of Optics, 2nd edition, McGraw-Hill. Chapter 17; 53 pages 1995.
Isaksen, A. "Dynamically Reparameterized Light Fields", Department of Electrical Engineering and Computer Science; MIT; Nov. 2000; 79 pages.
Kargel, J. S. et al., "Formation and dissociation of clathrate hydrates on Mars: Polar caps, northern plains, and highlands", Lunar Planet. Sci., XXXI, 2000. Abstract. 2 pages.
Kemp, A.J. et al. "Polarization effects, birefringent filtering, and sin—gle—frequency operation in lasers containing a birefringent gain crystal", IEEE J. Quantum Elect. 36, 228-235 (2000).
Klingelhofer, G. "The miniaturized spectrometer MIMOS II: The 2001 and 2003 US Mars missions and terrestrial applications in materials science and industry, in Mossbauer Spectroscopy in Materials Sciences", Kluwer Acad., Norwell, Mass., 1999. pp. 413-426.
Komatsu, G. et al. "A chaotic terrain formation hypothesis: Explosive outgas and outflow by dissociation of clathrate on Mars", Lunar Planet. Sci., XXXI, abstract 1434, 2000; 2 pages.
Kudryavtsev, A. B. et al. "In situ laser imagery of Precambrian microscopic fossils", Proc. Natl. Acad. Sci., vol. 98, pp. 823-826, 2001.
Kuebler, K. E. et al. "Can we detect carbonate and sulfate minerals on the surface of Mars by Raman spectroscopy?", Lunar Planet. Sci., XXXII, abstract 1889, 2001. 3 pages.
Lane, M. D., "Midinfrared optical constants of calcite and their relationship to particle size effects in thermal emission spectra of granular calcite", Journal of Geophysical Research., vol. 104; No. E6; pp. 14,099-14,108, Jun. 25, 1999.
Long, D. A., Raman Spectroscopy, McGraw-Hill, New York, 1977. 10 pages.
Longhi, J., "Clathrate and ice stability in a porous Martian regolith", Lunar Planet. Sci., XXXII, abstract 1955, 2001. 2 pages.
Longhi, J., "Low-temperature phase relations in the CO2—H2O system with application to Mars", Lunar Planet. Sci., XXXI, abstract 1518, 2000. 2 pages.

(56) References Cited

OTHER PUBLICATIONS

Ma, Y. et al. "Single—longitudinal mode Nd:YVO4 microchip laser with orthogonal-polarization bidirectional travelling-waves mode", Opt. Express 16, pp. 18702-18713 (2008).
MacKinnon, N. et al., "A laser diode array pumped, Nd:YVO4/KTP, composite material microchip la—ser", Opt. Commun. 105, 183-187 (1994).
Madsen, M.B. et al. "The magnetic properties experiments on Mars Pathfinder", J. Geophys. Res., vol. 104, pp. 8761-8779, 1999.
Matthews, D.G. et al. "Bluemicrochip laser fabricated from Nd:YAG and KNbO3", Opt. Lett. 21, 198-200 (Feb. 1, 1996).
McCain et al., "Multimodal multiplex Raman spectroscopy optimized for in vivo chemometrics", Biom. Vibr. Spectr. III: Adv. In Research and Industry, Proc. of SPIE vol. 6093, 2006.
McNally, J.G., et al. "Artifacts in computational optical-sectioning microscopy" J. Opt. Soc. Am. A; vol. 11; No. 3; Mar. 1994; pp. 1056-1067.
McSween, H. Y., Jr. et al. "Petrogenesis of the Elephant Moraine A79001 meteorite: Multiple magma pulses on the shergottite parent body", Geochim. Cosmochim. Acta, 47, 1501-1513, 1983.
Mlynczak, J. et al. "Wavelenght tuning in Er3+, Yb3+: glass microchip lasers", Opto—Electron. Rev. 17, 84-88 (2009).
Morris, R. V. et al. "Phyllosilicate-poor palagonitic dust from Mauna Kea Volcano (Hawaii): A mineralogical analogue for magnetic Martian dust", J. Geophys. Res., 106, 5057-5083, 2001.
Morris, R. V., et al., "Mineralogy, composition, and alteration of Mars Pathfinder rocks and soils: Evidence from multispectral, elemental, and magnetic data on terrestrial analogue, SNC meteorite, and Pathfinder samples", J. Geophys. Res., 105, 1757-1817, 2000.
Nayar, S.K., et al. "Assorted Pixels : Multi-Sampled Imaging With Structural Models" , Proc. ECCV 2002. 16 pages.
Ng, R. 2005. Fourier slice photography, Proc. SIGGRAPH 2005. 10 pages.
Ng, R. et al.. 2005. Light Field Photography with a Hand-Held Plenoptic Camera, Stanford Tech Report CTSR Feb. 2005. 11 pages.
Okhapkin, M.V. et al. "Tunable single-frequency di—ode—pumped Nd:YAG ring laser at 1064/532 nm for optical frequency standard applications", Opt. Commun. 203, 359-362 (2002).
Pieters, C. M. et al. "Optical effects of space weathering: The role of the finest fraction", J. Geophys. Res., 98, 20,817-20,824, 1993.
Rieder, R., et al. "Determination of the chemical composition of Martian soils and rocks: The alpha proton X-ray spectrometer", J. Geophys. Res., 102, 4027-4044, 1997.
Schechner, Y. The optimal axial interval for estimating depth from defocus, Proc. ICCV 1999. pp. 834-838.
Schechner, Y. et al. "Generalized Mosaicing", Proc. ICCV 2001 pp. 17-24.
Schoen, C. L.et al. "Long fiber-optic remote Raman probe for detection and identification of weak scatterers", Appl. Opt., 31, 7707-7715, 1992.
Sharma, S. K., et al. "Fiber-optic remote Raman probe design for use in monitoring processes in a high-temperature oven", Appl. Spectrosc., 47, 377-379, 1993.
Sotor et al., "Single-longitudinal mode Nd:YVO4/YVO4/KTP green solid state laser", Opto. Electron. Rev., vol. 18, No. 1, 2010. pp. 75-79.
Sum, A. K., et al. "Measurement of clathrates via Raman spectroscopy", J. Phys. Chem., B101, pp. 7371-7377, 1997.
Svelto, C. et al., "Characterization of Yb—Er: glass lasers at 1.5 μm wavelength in terms of amplitude and frequency stability", Measurement 26, 119-128 (1999).
Swedlow, J.R. et al. 1997. Deconvolution in optical microscopy. In Deconvolution of Images and Spectra, Academic Press, 284-309.
Walsh, M. M., et al., "Modes of accumulation of carbonaceous matter in the early Archean: A petrographic and geochemical study of the carbonaceous cherts of the Swaziland Supergroup, in Geologic Evolution of the Barberton Greenstone Belt, South Africa", Spec. Pap. Geol. Soc. Am., vol. 32, pp. 115-132, 1999.

Wang et al., "Development of the Mars microbeam Raman spectrometer (MMRS)", J.1 of Geoph. Research, vol. 108, No. E1, 5005, 2003. 18 pages.
Wang, A. et al. "Seeking and identifying phyllosilicates on Mars: A simulation study", Lunar Planet. Sci. [CD-ROM], XXXIII, abstract 1370, 2002.
Wang, A. et al. "Raman spectroscopic characterization of a highly weathered basalt: Igneous mineralogy, alteration products, and a micro-organism", J. Geophys. Res., 104, 27,067-27,077, 1999.
Wang, A. et al. Raman spectroscopic characterization of a Martian SNC meteorite Zagami, J. Geophys. Res., 104, 8509-8519, 1999.
Wang, A. et al. "Raman spectroscopy as a method for mineral identification on lunar robotic exploration missions", J. Geophys. Res., 100, 21,189-21,199, 1995.
Wang, A. et al. "Raman spectral features of pyroxene: Application to Martian meteorites Zagami & EETA79001", Lunar Planet. Sci., XXX, abstract 1666, 1999. 2 pages.
Wang, A. et al. "Characterization and comparison of structural and compositional features of planetary quadrilateral pyroxenes by Raman spectroscopy", Am. Mineral., 86, 790-806, 2001.
Wang, A. et al. Raman spectroscopic characterization of phyllosilicates, Lunar Planet. Sci., XXXIII, abstract 1374, 2002. 2 pages.
Wang, A. et al. "Database of standard Raman spectra of minerals and related inorganic crystals", Appl. Spectrosc., 48, 959-968, 1994.
Wang, A. et al. "Raman spectroscopy of opaque minerals and applications to EETA79001 Martian meteorite", Lunar Planet. Sci., XXXII, abstract 1615, 2001.
Wang, A. et al. "Mineral features of EETA79001 Martian meteorite revealed by point-counting Raman measurements as anticipated for in-situ exploration on planetary surfaces", Lunar Planet. Sci., XXXI, abstract 1887, 2000.
Wang, A. et al. "Characterization of mineral products of oxidation and hydration by laser Raman spectroscopy: Implications for in situ petrologic investigation on the surface of Mars", Lunar Planet. Sci., XXVIII, abstract 1819, 1998. 2 pages.
Wang, A. et al. "A Raman spectroscopic sensor for in situ mineral characterization on planetary surface", Appl. Spectrosc., 52, 477-487, 1998.
Wang, A. et al. "Raman spectroscopic detection of graphitic carbon of biogenic parentage in an ancient South African chert", Lunar Planet. Sci., XXXII, abstract 1432, 2001.
Wang, A., "Some grain size effects on Raman scattering intensity for in situ measurements on rocks and soils: Experimental tests and modeling", Lunar Planet. Sci., XXX, abstract 1644, 1999.
Wopenka, B. et al. "Structural characterization of kerogens to granulite-facies graphite: Applicability of Raman microprobe spectroscopy" American Mineralogist, vol. 78; pp. 533-557, 1993.
Watanabe J. et al. "Oscillating longitudinal—mode control of a microchip green laser by injection current", Opt. Express 15, 965-970 (2007).
Wynn-Williams, D. D. et al. Proximal analysis of regolith habitats and protective biomolecules in situ by laser Raman spectroscopy: Overview of terrestrial Antarctic habitats and Mars analogs, Icarus, 144, 486-503, 2000.
Yen, A. S. et al. "Evidence that reactivity of the Martian soil is due to superoxide ions", Nature, 289, 1909-1912, 2000.
Zayhowski, J.J. "The effects of spatial hole burning and en—ergy diffusion on the single-mode operation of stand-ing-wave lasers", IEEE J. Quantum Elect. vol. 26; No. 12; pp. 2052-2057 (1990).
Wang, A. et al. "Prototype Raman Spectroscopic Sensor for in Situ Mineral Characterization on Planetary Surfaces" Applied Spectroscopy; vol. 52; No. 4; 1998; pp. 477-487.
Soderblom, L. "The Composition and Mineralogy of the Martian Surface from Spectroscopic Observations: 0.3um to 50um" Spectroscopic Observations of the Surface; University of Arizona Press; 1992, pp. 557-593.
Squyres, S.W. et al. "The Mars 2001 Athena Precursor Experiment (APEX)" Lunar and Planetary Science XXX; Abstract 1672; 1999; 3 pages.
Pieters, C.M. et al. "Visible-Infrared Properties of Controlled Laboratory Soils" Lunar Planet Sci. Conference XXIV, pp. 1147-1148, 1993.

(56) References Cited

OTHER PUBLICATIONS

Cooney, T.F. et al. "Comparative Study of Some Fiber-Optic Remote Raman Probe Designs. Part II: Tests of Single-Fiber, Lensed, and Flat- and Bevel-Tip Multi-Fiber Probes" Applied Spectroscopy, vol. 50; No. 7; 1996; pp. 849-860.

Pieters, C.M. et al. "Strength of Mineral Absorption Features in the Transmitted Component of Near-Infrared Reflected Light: First Results from RELAB" Journal of Geophysical Research; vol. 88; No. B11; pp. 9534-9544; Nov. 10, 1983.

* cited by examiner

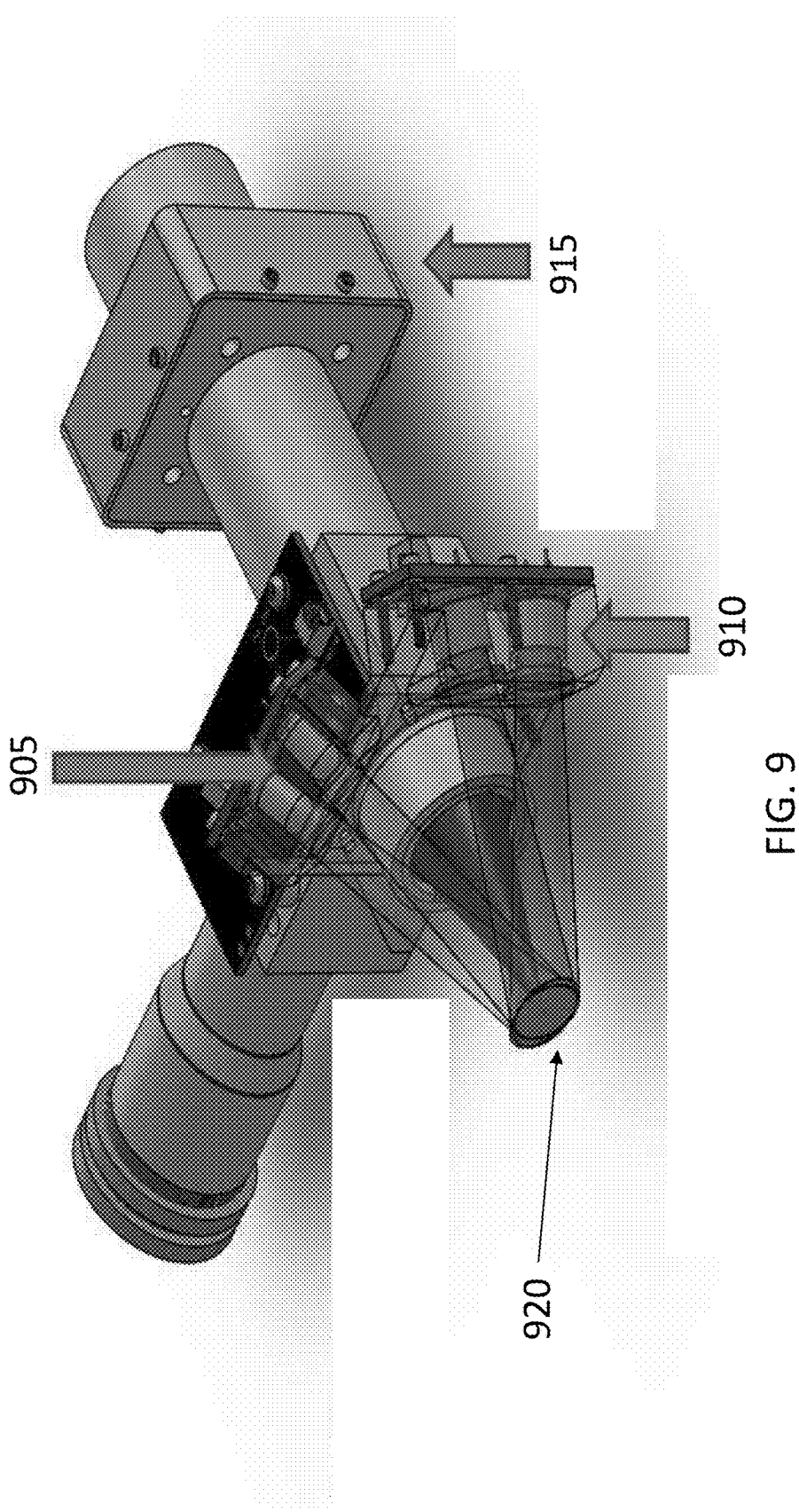

CONTEXT IMAGING RAMAN SPECTROMETER

CROSS REFERENCE TO RELATED APPLICATIONS

The present application claims priority to U.S. Provisional Patent Application No. 62/101,457, filed on Jan. 9, 2015, the disclosure of which is incorporated herein by reference in its entirety.

STATEMENT OF INTEREST

The invention described herein was made in the performance of work under a NASA contract NNN12AA01C, and is subject to the provisions of Public Law 96-517 (35 USC 202) in which the Contractor has elected to retain title.

TECHNICAL FIELD

The present disclosure relates to optical spectroscopy. More particularly, it relates to a context imaging Raman spectrometer.

BRIEF DESCRIPTION OF DRAWINGS

The accompanying drawings, which are incorporated into and constitute a part of this specification, illustrate one or more embodiments of the present disclosure and, together with the description of example embodiments, serve to explain the principles and implementations of the disclosure.

FIG. 9 illustrates an exemplary ring of LEDs.

SUMMARY

Figure 1:
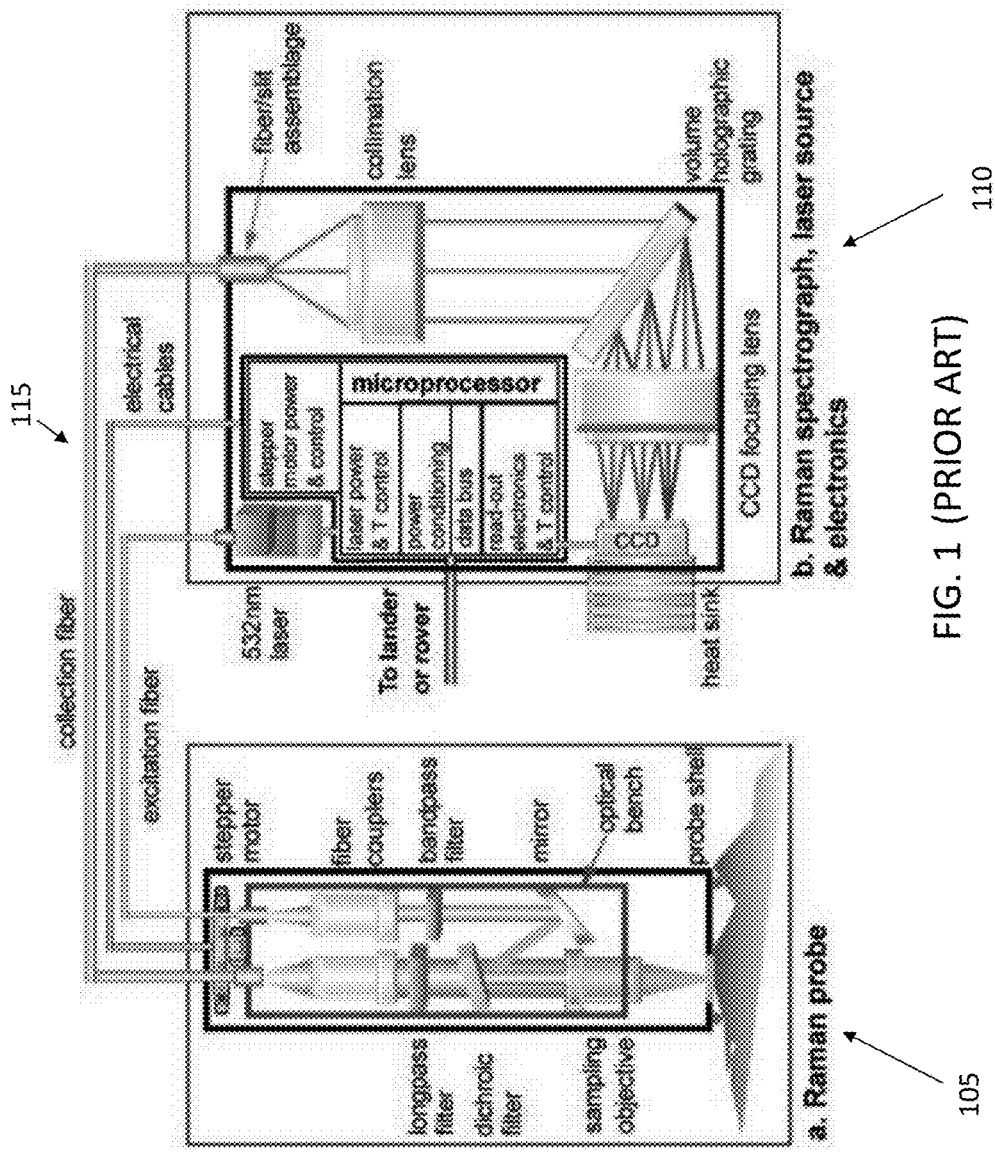
FIG. 1 illustrates an exemplary portable Raman instrument.

In a first aspect of the disclosure, a device is described, the device comprising: a first laser to emit a first laser light at a first wavelength; a plurality of LEDs to emit LED light at a second wavelength different from the first wavelength; a plurality of optical elements to convey the first laser light from the first laser onto a sample and collect a Raman shifted light and the LED light from the sample; a Raman detector to collect the Raman shifted light; and a context imager detector to collect the LED light.

In a second aspect of the disclosure, a method is described, the method comprising: emitting a first laser light at a first wavelength by a first laser; emitting LED light at a second wavelength different from the first wavelength by a plurality of LEDs; by a plurality of optical elements, conveying the first laser light from the first laser onto a sample and collecting a Raman shifted light and the LED light from the sample; detecting the Raman shifted light by a Raman detector; and detecting the LED light by a context imager detector.

DETAILED DESCRIPTION

Raman spectroscopy is a powerful tool for mineral characterization and for detection of water and organic and inorganic forms of carbon. For example, the Mars microbeam Raman spectrometer (MMRS) is designed for close-up analysis of rocks and soils in planetary surface exploration, as described by Wang et al., Development of the Mars microbeam Raman spectrometer (MMRS), J.1 of Geoph. Research, vol. 108, no. E1, 5005, 2003, the disclosure of which is incorporated herein by reference in its entirety. The MMRS consists of a probe (in a flight unit to be deployed by a robotic arm) and a spectrograph, laser source, and electronics (in a flight unit to reside on a rover or lander). The Raman probe has a scanning optical bench that enables a 1-cm linear traverse across a target rock or soil, both on target materials as encountered and on fresh surfaces of rocks exposed by abrasion or coring. From these spectra, it is possible to identify major, minor, and trace minerals, obtain their approximate relative proportions, and determine chemical features (e.g., Mg/Fe ratio) and rock textural features (e.g., mineral clusters, amygdular fill, and veins). It is also possible to detect and identify organic species, graphitic carbon, and water-bearing phases. Extensive performance tests have been done on a brassboard model of the MMRS using a variety of geological materials (minerals, rocks, Martian meteorites, etc.). These tests show that a Raman spectrometer can be built that is suitably miniaturized, sufficiently robust, and low enough in power usage to serve as an on-surface planetary instrument, yet the spectrometer can retain high detection sensitivity and yield near laboratory quality spectra over a broad wavelength range. These features are essential to provide definitive mineralogy in a planetary exploration.

In other embodiments, the Raman spectrometer described in the present disclosure may have different applications, such as medical imaging or mineral analysis of rocks. The Mars spectrometer is used herein as an example, and other applications are within the scopes of the present disclosure. In some embodiments, a Raman spectrometer can enable direct information about chemical bonding and crystal structure, and thus enable direct identification of oxyanionic minerals, oxide and sulfide minerals (FeOOH, $Fe_2O_3$, $Fe_3O_4$, FeS, $FeS_2$, $TiO_2$, etc.), water and waterbearing minerals (ice, $CaSO_4$ $2H_2O$, micas, clay minerals, clathrates, etc.) and organic and inorganic carbon. A Raman spectrometer can provide information on rock texture, and it can determine cation ratios in many minerals.

In some embodiments, Raman spectroscopy includes scanning across the target surface with a microbeam, which enables statistical estimates of relative abundance for major minerals and detection of minor and trace minerals. For example, a Raman microanalytical instrument, the Mars microbeam Raman spectrometer (MMRS), can be simple, robust, low mass, small volume, conservative of power, and able to work in the harsh environments encountered by flight instruments. The instrument has the sensitivity and spectral range and quality that approach those of a modern laboratory Raman instrument. It can scan unmodified surfaces of rocks and soils as encountered, without sample preparation, as well as examine abraded rock surfaces and cores.

An on-surface Raman system should cover a broad spectral region and have adequate spectral resolution and detection sensitivity. For example, a range of 200-1800 $cm^{-1}$ for characterization of minerals and graphitic carbon, and 2500-4000 $cm^{-1}$ for detection of organic functional groups and water. In some embodiments, a spectral resolution of 7 $cm^{-1}$ can give a wave number precision of less than 2 $cm^{-1}$ for peak positions. In some embodiments, the probe delivers 10 mW of laser power to the target. To achieve a high tolerance of the relief intrinsic to unprepared, rough sample surfaces (rock or soils) without an autofocus mechanism, the probe has a large depth-of-sampling field. To obtain a line of 100 spectra along a 1.2-cm traverse of the target surface, the probe uses a simple line-scan mechanism. Combining a microbeam with a line-scanning traverse capability increases the probability of finding minor minerals and weak Raman scattering phases because the spectrum obtained at most spots will be of only one or two minerals. The overall result of such a line scan is thus the identification of major minerals, minor minerals, and determination of rock texture, rough mineral proportions, and mineral chemistry. In other embodiments, different technical specifications may be used to realize the Raman spectrometer.

In Raman spectroscopy, monochromatic light from a source is scattered inelastically from the target material, for example, a mineral. The spectrometer rejects reflected light from the source and Rayleigh-scattered light of that same wavelength, and it analyzes the longer wavelengths of the Raman-scattered light (Stokes lines). The difference in wavelength between the source light and the scattered light corresponds to transition energies in the material that produced the scattering. This difference in wavelength, normally given in units of wave number, $cm^{-1}$, is called the "Raman shift." For example, inelastic scattering from the silicate mineral olivine gives Raman-scattered light of several principal wavelengths, and those wavelengths are characteristic of olivine. The transitions that give rise to these main peaks are Si—O vibrational motions, transitions whose energies correspond to those of mid-infrared and far-infrared photons. For many minerals, a plethora of minor peaks is also produced. A technological advantage of Raman spectroscopy is that it provides information similar to that obtained by mid-infrared and far-infrared spectroscopy, but the spectra can be obtained in the visible spectral region where Raman spectroscopy is efficient. Also, lasers and detection systems in the visible region of the spectrum are well understood and have space flight heritage because most optical and electro-optical components have their best performances there and have a long history of successful fabrication.

Because the Raman effect is weak compared to other signal sources, a laser excitation source is required for practical use. Shorter excitation wavelengths can be the most effective for a given laser power because of the inverse dependence of Raman scattering intensity on the fourth power of the wavelength. For mineralogical work, relative freedom from photoluminescent interference in the fundamental vibrational regions of oxyanionic minerals, oxide and sulfide minerals, and $H_2O$ and OH can be important. Therefore, in some embodiments, a 532 nm (green) laser is very suitable for Raman spectroscopy according to the present disclosure. However, other wavelengths may be used. For example, blue or red wavelengths. Small, mechanically robust, relatively power-efficient lasers at the green wavelengths are available, such as diode pumped, frequency-doubled $YVO_4$/Nd+KTP devices.

In some embodiments, as visible in FIG. 1, the devices of the present disclosure can comprise a Raman probe (105) and a spectrometer (110). The probe (105) may comprise different elements such as optical filters and lenses. The probe and the spectrometer may be connected with multiple optic fibers (115). A fiber may be used for the excitation laser, while another fiber may be used for collecting the resulting signal. For example, a lens focuses the laser beam onto the sample and collects the backscattered radiation from the sample, which includes reflected laser light, Rayleigh-scattered light, and Raman-scattered light at a shifted wavelength. The probe filters out the reflected and Rayleigh-scattered radiation and directs the Raman signal to a second optical fiber that leads to the spectrograph.

In some embodiments, the objective lens focuses the laser light which can be advantageous. A coaxial light path of excitation and collection can ensure maximum cone overlap and thus maximum collecting efficiency of the Raman-scattered light. In some embodiments, the same objective lens can be used to condense the laser beam onto the sample and to collect the scattered Raman radiation from the sample.

In some embodiments, a multimode optical fiber can be used instead of a single-mode optical fiber for transfer of the excitation laser beam to the probe. A multimode optical fiber can improve system robustness against mechanical vibration and have a higher coupling efficiency of the excitation laser power.

In some embodiments, the Raman probe is deployed with a mechanical arm of a rover. For example, the arm can press the probe against the target, thus fixing the average distance between the sampling (and condensing) objective and the target. For simplicity and ruggedness, in these embodiments, no automatic focusing is used. Instead, the probe has an effective depth-of-sampling field of several millimeters to accommodate the surface roughness anticipated for most samples. This is achieved by using a sampling objective with a long working distance (1 cm) and a low numerical aperture (NA=0.45). A multimode optical fiber (d=200 mm) can be used to collect the Raman signal from the probe and to transfer it to the spectrograph. This fiber acts like an oversized iris at the back-imaging plane of the sampling objective, making it possible to collect Raman signal from off-focus planes of the sample. This configuration gives an effective depth-of-sampling field that considerably exceeds the depth of focus of the objective as normally considered. This large effective depth-of-sampling field is an advantage in Raman measurements on the uneven sampling surfaces of rocks.

In some embodiments, a rock is analyzed by taking a spectrum at different points of the rock surface, by moving the probe in a series of steps. In this way, a spectrum is taken at each step. The condensed laser beam activates only a small volume of the target, which usually contains only one or two mineral grains, so only their spectra are recorded. One of those grains may be a minor or trace mineral in the rock or soil, but it provides a major part of the Raman signal at that sampling point. This procedure increases the probability of detecting minor and trace minerals as well as weak Raman scattering minerals, whose signals would be lost in the background noise of the minor peaks of strong Raman scattering minerals if they were simultaneously excited by a broad excitation laser beam. Peak positions are key for mineral identification; peak intensities are normally not used for that purpose.

In some embodiments, the Raman spectroscopy device of the present disclosure may comprise dielectric band-pass, dichroic, and long-pass edge filters in the optical train of the probe. These filters have low coefficients of thermal expansion. Raman signal is produced within the optical fiber that transmits the laser beam to the probe. This Raman signal extends to >1000 $cm^{-1}$ and has a maximum near 430 $cm^{-1}$. The band-pass filter attenuates this signal, for example, by a factor of $10^{-5}$ (OD >5) at a Raman shift position of 105 $cm^{-1}$. The filter has a greater than 80% transmittance at the excitation laser wavelength (532 nm), so it does not significantly decrease the laser power to the sample. The dichroic filter can serve as a front-surface mirror to direct the laser beam toward the sampling objective. This same filter, when acting in transmissive mode has an OD >4.5 at the excitation wavelength (for example, at 532 nm) to reject much of the component of the backscattered radiation (Rayleigh-scattered or reflected laser radiation) and a transmittance of 93±4% starting from 543 nm (Raman shift of 380 cm$^{-1}$). This provides efficient transfer of the Raman signal from the sample. A long-pass edge filter provides additional rejection of 10 with an OD level of 4.5 at 532 nm, and an even higher transmittance (95±4%) for Raman signals. Overall, an exemplary probe can reach 41% effective transmission for the 532 nm excitation beam, and 64% for on-focus Raman signal collected at a Raman shift of 3000 cm$^{-1}$ (633 nm).

In some embodiments, the radiation resulting from the laser excitation is collimated, dispersed, and imaged onto a CCD detector (Charge Coupled Device). For example, the MMRS spectrograph has an axially transmissive optical train, as visible in FIG. 1. In some embodiments, the axially transmissive optical train comprises a volume holographic transmissive grating that is matched by two sets of on-axis lenses for high-quality imaging. An advantage of a totally transmissive optical train in a flight spectrograph is its lower sensitivity to the unavoidable misalignments in a miniaturized instrument and to mechanical vibrations that may occur during rover mobility operations. The angular displacement of a ray caused by a misalignment or a mechanical vibration passing along a transmissive optical path is only half as large as it would be on passing along a reflective optical path.

Additionally, from the point of view of optical design, a transmissive, on-axis optical train has intrinsically low aberration. By using multicomponent lenses for collimating and focusing, almost complete correction of the major aberrations (spherical aberration, coma, and astigmatism) can be reached over a large wavelength range. This allows low f number optics with a large solid angle of acceptance to be used. The low f number optics also enable a high throughput for Raman photons. The low aberration results in high imaging quality and high spectral resolution. For an axially transmissive spectrograph, it is easy to approach diffraction limited imaging, so that spectral resolution may be limited mainly by the width of pixels rather than by the point spread function of the optics. In addition, the low level of scattering by a volume holographic grating results in a lower level of stray light than is normally achieved using reflective components. For example, a volume holographic grating used has groove densities of 2455 lines/mm (lower Raman shift region) and 2156 lines/mm (higher region) to provide high angular dispersion. Lenses with very short focal lengths can therefore be used to attain high spectral resolution, thus allowing the spectrograph to remain compact in size.

In several embodiments, a dispersive spectrograph involves a trade-off between spectral coverage and spectral resolution to match a detector of fixed length. A transmissive, dual-blaze grating can simultaneously disperse two separate spectral regions onto one CCD frame. Each spectral region can make full use of the 1088 channels (20 pixels high) of the CCD detector. In this way, the spectrograph covers the spectral ranges (200-1800 and 2500-4000 cm$^{-1}$) required to achieve the detection of a wide variety of minerals and organic substances, yet with adequate spectral resolution to determine cation ratios of geologically important phases (e.g., pyroxenes, olivine, carbonates, and sulfates). With this dual-blaze grating, it is possible to achieve a spectrograph of low mass and volume with wide spectral coverage and high spectral resolution.

In most high-performance laboratory Raman instruments, a fiber-slit assemblage is used. Raman radiation transported via an optical fiber can be either directly coupled to or imaged onto the slit to form a rectangular image of the collected Raman radiation. This image is registered on the CCD, and its width determines the spectral resolution. The throughput of such an assemblage depends on the core diameter of the optical fiber relative to the slit width, that width being established by the required spectral resolution. To achieve a desired spectral resolution, it may be required to have a 50 mm input aperture to the spectrograph. In some embodiments, the collecting fiber of the present disclosure is 200 mm in diameter, in which case nearly 70% of the Raman signal is sacrificed in order to preserve resolution by using a 50 mm slit.

In some embodiments, such as in the MMRS brassboard, a three-element lens collimates the Raman beam received from the fiber-slit assemblage, and a four-element lens condenses the dispersed spectral images onto the CCD detector. This pair of multicomponent lenses is aberration-corrected and provides a 1:1 image of the slit onto the detector, which achieves the necessary spectral resolution.

In some embodiments operating in the visible spectral region, a silicon-based CCD camera can be used as the detector. For example, a frame transfer, 1088×1088-pixel CCD chip with a pixel size of 12×12 mm can be used as the detector. An attractive feature of this CCD is its low dark current at relatively high temperatures (typically below 50 pA/cm$^2$ at 25° C.).

In some embodiments, Raman point counting is the procedure used to study rocks. In this procedure, a number of sequential Raman spectra (e.g. 100) is taken along a linear traverse on the surface of a rock. Each Raman spectrum obtained will contain the peaks of the minerals excited by the excitation laser beam. Mineral proportions can be estimated from the frequency of appearance of the Raman spectrum of each mineral in the set of spectra. For example, if plagioclase is observed at 40 out of 100 points, then the rock contains <40% plagioclase (in some cases, more than one mineral will fall within the excitation volume). To a first approximation, it is possible to claim 40±6% plagioclase. Such an estimate is usually adequate for rock classification, for which both mineral proportions and mineral grain size are needed. Grain size is inferred to be large if a sequence of points in a scan give spectra of the same mineral and the cation ratio is constant or varies monotonically across the sequence. The proportion of a trace phase cannot be well determined from a 100-point scan; the trace phase can show up more often or less often than its actual proportion in the rock, or it can be missed all together. The frequency with which a trace phase is observed depends on its Raman scattering cross section and on its proportion in the rock or soil, its grain size, and the uniformity of its dispersion. In addition, cation ratios of olivine, pyroxene, and some oxide minerals can be obtained from the spectra, and these provide further information about the origin and alteration of the rocks.

Obtaining this information by Raman point counting requires that a high fraction of the spectra from a point counting traverse have detectable Raman peaks. In some cases, spectra without detectable peaks occur for two general reasons. In one case, the Raman scatterers yield such a low level of counts that no spectral peak rises above the spectral background noise. This situation most often occurs when the focal plane of the laser beam is offset by several millimeters from the sample surface or when the sample is very dark and there is strong absorption of the laser beam. This problem can often be remedied by increasing the integration time to minutes. In the other case, the spectrum has such a high background that the noise masks the Raman peaks. This usually occurs because the laser has excited a highly fluorescent substance. These spectra are not uninformative, however. Many organic residues encountered in rocks or soils yield high fluorescence, which means that fluorescence is an indicator that such material might be present. Some mineral phases are also fluorescent, and some of these minerals have narrow fluorescent spectral lines that are diagnostic of the particular element (especially the rare earth elements). Inorganic fluorescence from Mn and Fe are common and give broad peaks. The central location of such broadband fluorescent backgrounds, both organic and inorganic in origin, and seen mainly in some carbonates and feldspar, provides information about the origin and history of the host rock.

In most cases, it is more difficult to obtain good spectra from minerals in rocks than from separated, individual mineral grains. Surfaces of rocks are rough, sizes of mineral grains may be small, the laser beam reflects from internal mineral boundaries as well as from the surface of the rocks, and fluorescent phases may be present. These factors all reduce the strength of the Raman signals or increase background.

As noted above in the present disclosure, the optical design of a Raman probe, in some embodiments, can provide a depth-of-sampling field of millimeters. In conjunction with that aspect of the optical design, a high overall level of system light throughput is needed because the Raman signals from off-focus measurements are weaker than those taken near the focus. This can be an issue for intrinsically weak Raman scatterers rather than for strong ones, and the maximum off-focus distance for detecting weak scatterers is thus shorter than that for strong scatterers. An important factor that affects the distance for off-focus detection of a mineral is the nature of the matrix in which it resides and the grain size of that matrix. Off-focus measurements sample a larger area than on-focus measurements, and in a fine-grained material, off-focus measurements can involve Raman signal from several grains rather than just one or two. Thus, if the target is far enough out of focus, only strong scatterers may be detected even when a weak scatterer is within the illuminated volume. If at a particular location a strong scatterer is observed to have a weaker peak intensity than is common at other locations on the target, the location from which that spectrum was obtained may be significantly off focus. Also, if the matrix has a high level of fluorescent emission, or if the matrix is a strong absorber of the excitation laser wavelength, the Raman emission from a particular mineral grain in the matrix could be missed when a large area of matrix gets sampled in an off-focus measurement.

In certain applications, such as for example geophysical application, the fluorescence cross section is greater than the Raman cross section. As known to the person skilled in the art, fluorescence is the radiation due to a shift in energy level of electrons due to the emission of energy previously absorbed by the excitation photons. Raman signals are irradiated as a relatively small shift in the excitation wavelength and the Raman energy of the signal is proportional to that projected by the excitation laser. Therefore, the signal from the shifted peaks may not be clearly visible, due to noise, when super-imposed with the fluorescence signal.

To obviate the difference in power between the Raman and fluorescence signals, a multimodal multiplex Raman spectrometer which uses multi-wavelength excitation can be used to better detect Raman signals in the presence of fluorescence by taking advantage of the shift-variance of the Raman signal with respect to excitation frequency, for example as described by McCain et al., Multimodal multiplex Raman spectroscopy optimized for in vivo chemometrics, Biom. Vibr. Spectr. III: Adv. In Research and Industry, Proc. of SPIE vol. 6093, 2006, the disclosure of which is incorporated herein by reference in its entirety. The signal collected from the multi-wavelength excitation can be processed to extract the Raman signal from the combined signal sources collected from the sample (comprising also the fluorescence signal). For example, statistical regression can be used. In some embodiments, partial least square regression or least square regression can be used. The shot noise due to fluorescence does not appear in the Raman signal, which is an advantage. As known to the person of ordinary skill in the art, the excitation wavelength used by McCain et al. could not be applicable to rocks, therefore a shorter wavelength must be used, such as green light wavelength as described herein. However, single mode laser sources are not common. Therefore, the present disclosure describes the use of a frequency doubling laser.

As known to the person of ordinary skill in the art, the second harmonic generation (also referred to as frequency doubling) is a nonlinear optical process, in which photons with the same frequency interacting with a nonlinear material can generate new photons with twice the frequency of the initial photons. For example, a birefringent crystal can be used. As known to the person of ordinary skill in the art, birefringence is the optical property of a material having a refractive index that depends on the polarization and propagation direction of light. These optically anisotropic materials are birefringent. A doubling crystal rotates the modes of the laser.

As described in the present disclosure, a multi-wavelength Raman spectroscopy setup is combined with a frequency doubling laser. This device enables statistical analysis of the collected signal, thus enabling the separation of the Raman signal from other signals such as the fluorescence signal. In some embodiments, a diode laser can be used coupled with a birefringent crystal that doubles the laser frequency to obtain green light. The green light is applied to the sample through a multi-wavelength Raman spectroscopy set up.

In some embodiments, the birefringent crystal is rotated in order to obtain a plurality of wavelengths to use in the multi-wavelength Raman spectroscopy set up. In this set up, the polarized light transmitted through the crystal rotates in a sinusoidal pattern. For example, a Lyot filter can be used. A Lyot filter is a type of optical filter that uses birefringence to produce a narrow passband of transmitted wavelengths. In some embodiments, the Lyot filter comprises one or more birefringent plates. The polarization state of light with a certain wavelength will be changed as it is transmitted through one of the plates, and this causes a loss of optical power as the light is transmitted through the next plate. For certain wavelengths, however, the optical path length difference is an integer multiple of the wavelength, so that the losses are very small. By rotating the plates, it is possible to shift the wavelengths of the transmission peaks.

In some embodiments, an electrically tunable liquid can be inserted between the birefringent plates to electrically control the Lyot filter. In other embodiments a change in temperature can be used, which can in turn change the sinusoidal modulation of the birefringent crystal filter, and therefore sweep the laser along multiple wavelengths. This effect is possible due to the temperature dependence of the refractive index of the crystal. For example, a heater can be placed on the birefringent crystal in order to control its temperature.

Therefore, in some embodiments, a frequency doubling laser (for example a green laser) is used in conjunction with a birefringent crystal (for example a Lyot filter), in order to obtain a plurality of wavelength that can be applied to a sample to enable a multi-wavelength analysis of the Raman signal.

Figure 5:
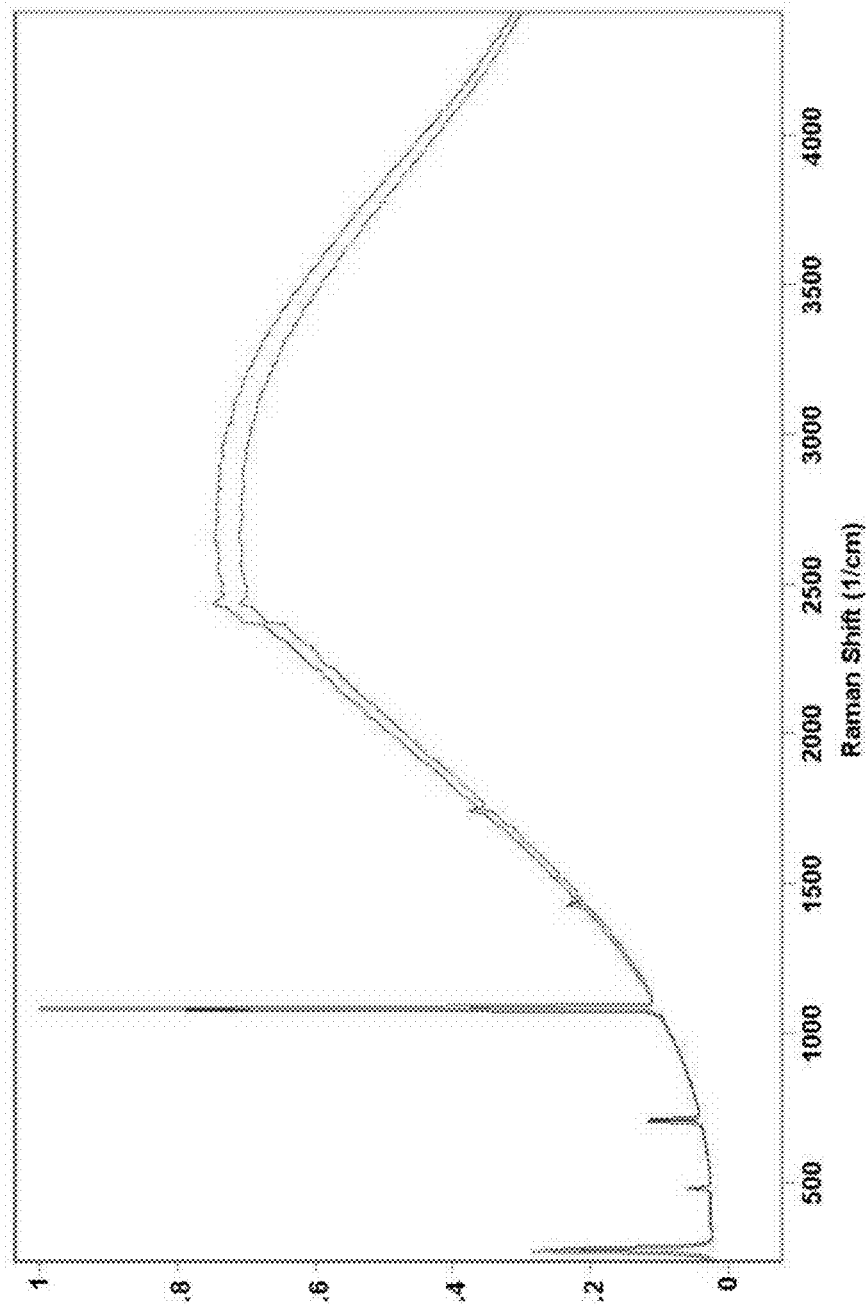
FIGS. 5-7 illustrate exemplary Raman measurements.
Figure 6:
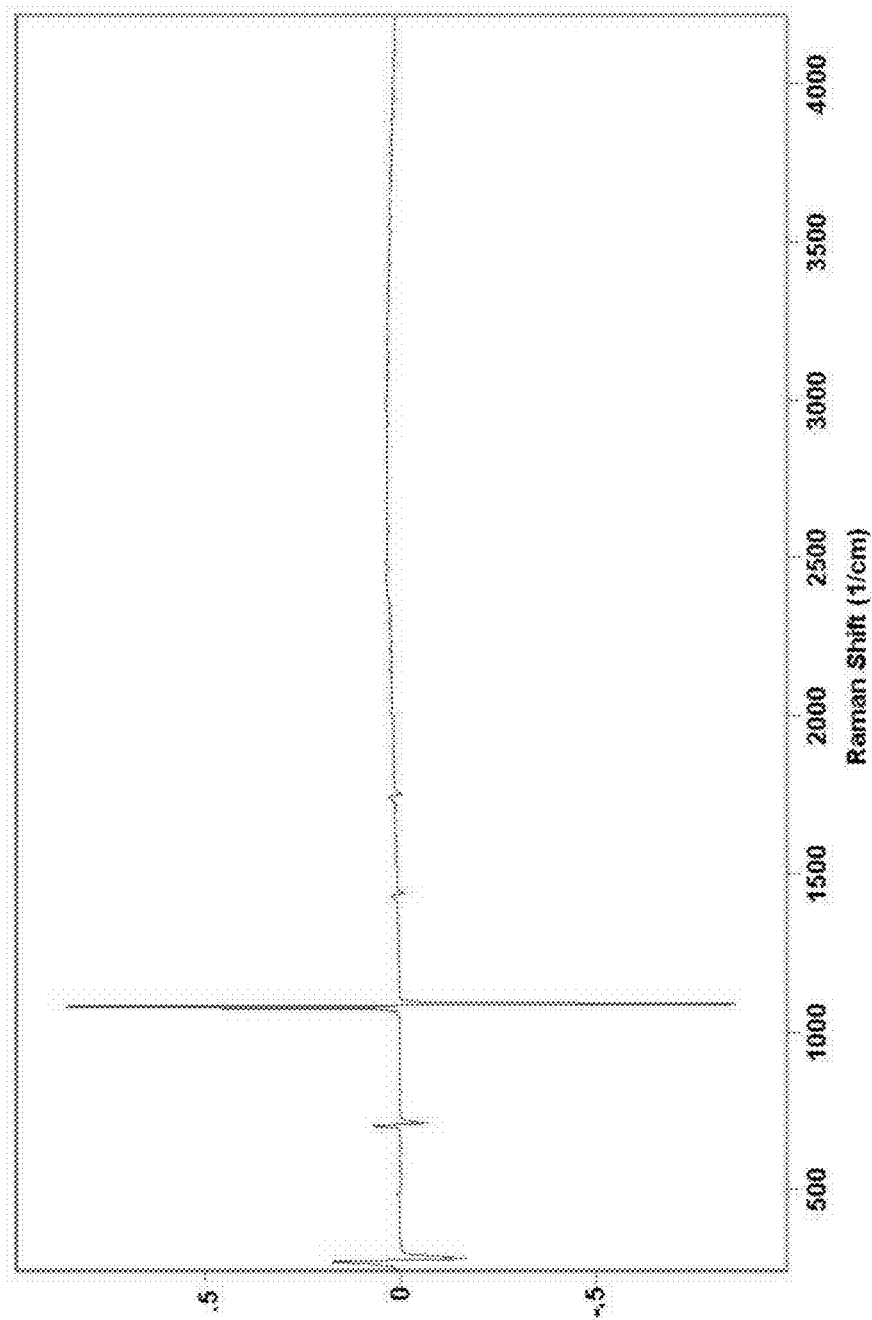
Figure 7:
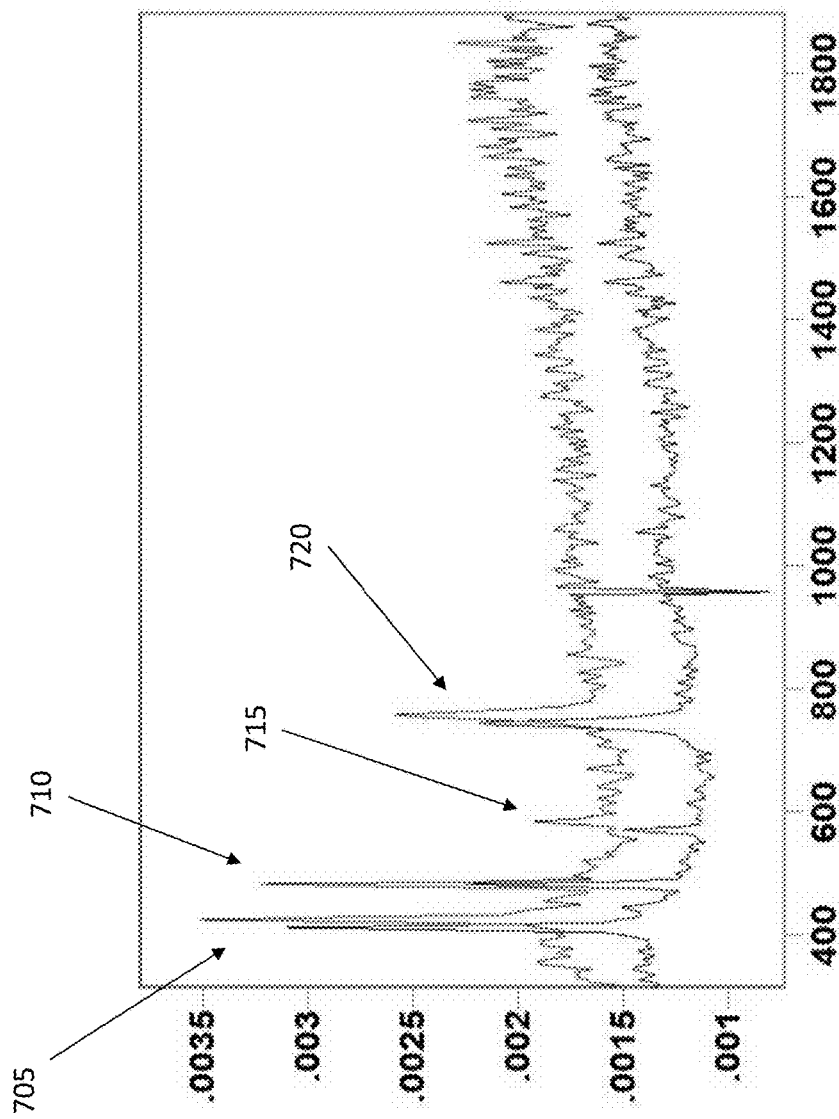

As discussed above, Raman spectroscopy allows the analysis and detection of different samples. However, fluorescence produced by elastic scattering and stray light can obscure the Raman signal. As known to the person of ordinary skill in the art, and as discussed by McCain et al. as cited above, shifted excitation Raman difference spectroscopy (SERDS) may be used to reduce interference from fluorescence and stray light by shifting the frequency of a laser light that is incident on a sample. The Raman bands are generally shifted in response to a shift in excitation frequency, while the broad background fluorescence and stray light are generally much less affected by the excitation frequency shift. Exemplary dual wavelength spectra captured with SERDS are illustrated in FIG. 5. The corresponding SERDS difference spectrum is illustrated in FIG. 6. FIG. 7 illustrates an example of how to distinguish between Raman and fluorescence signals using SERDS. The Raman peaks (705, 715, 720) are shifted for the two different excitation wavelengths, while the fluorescence peak (710) is not shifted.

Shifted excitation Raman difference spectroscopy generally involves a subtraction of two spectra obtained from two different excitation frequencies. The subtraction can result in a derivative spectrum that may reduce the background and fluorescence spectra thus allowing enhanced detection of the Raman signal. Shifted excitation Raman difference spectroscopy may not sufficiently reduce fluorescence and stray light in all environments. A spectral impulse response can be used to make a mathematical distinction between a non-Raman signal and the Raman signal. Both spectral components include sub-components that are linear and non-linear with respect to the exciting wavelengths. However, the linear components are generally stronger than the non-linear components. The linear terms are described by an impulse response. The non-Raman spectrum can be assumed to be constant for small shifts in excitation wavelength.

The distinguishing feature of the Raman and the non-Raman signals is that the Raman impulse response is typically shift invariant in the exciting field, while the non-Raman impulse response is not shift invariant. The term "shift invariant" means that the Raman impulse response is a function only of the difference between the observed frequency and the exciting frequency (McCain et al.).

McCain et al. uses the excitation spectrum of an array of lasers to shift the measured Raman spectra. These spectra can then be summed, and PLS-regression used to determine which portions of the signal correspond to the molecule of interest. By shifting the spectra, the Raman peaks will overlap and add, whereas any non-Raman signals will be distributed among many spectral channels thus making the estimation more robust against unknown interferents.

In the present disclosure, in some embodiments, instead of an array of lasers having different wavelengths, the same laser is used to produce different wavelengths. In some embodiments, a green frequency doubling laser is swept by modulating the birefringent crystal, thus producing a plurality of wavelengths.

For example, a single frequency, tuneable diode pumped Nd:YVO$_4$/YVO$_4$/KTP microchip laser operating at 532 nm can be used, as described by Sotor et al., Single-longitudinal mode Nd:YVO4/YVO4/KTP green solid state laser, Opto. Electron. Rev., 18, no. 1, 2010, the disclosure of which is incorporated herein by reference in its entirety. In some embodiments, the single frequency operation can be obtained with a birefringent filter, where an YVO$_4$ beam displacer acts as an ideal polarizer. This type of laser has a single frequency operation, and is tuneable over 0.6 nm in the spectral range around 1064 nm. The laser can operate with output power of 110 mW at 53 nm. The total optical efficiency (808 nm to 532 nm) can be 14%. Other types of single mode frequency doubling lasers may also be used.

Figure 2:
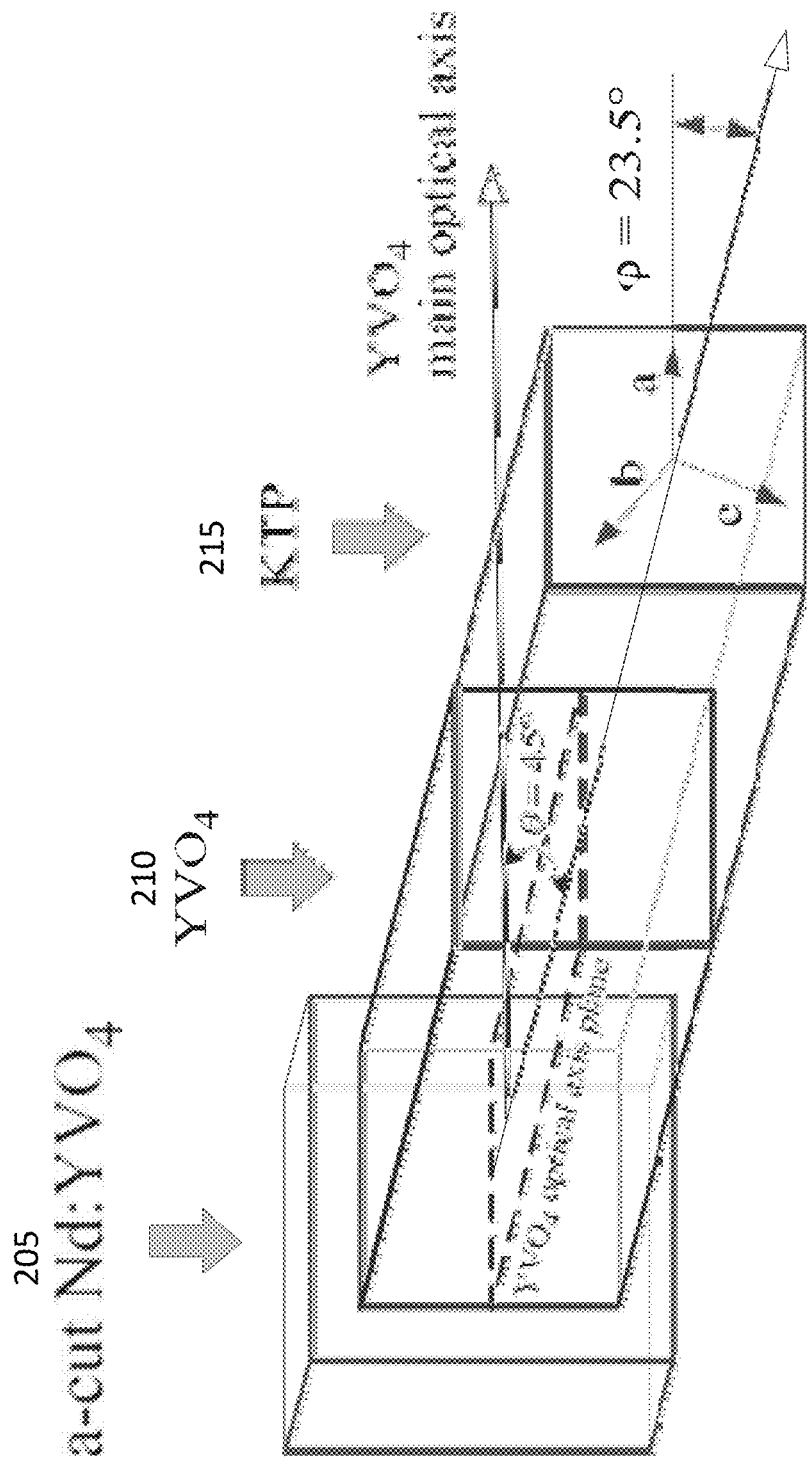
FIG. 2 illustrates an exemplary Nd:YVO4/YVO4/KTP laser.

An exemplary Nd:YVO$_4$/YVO$_4$/KTP laser is illustrated in FIG. 2, where the Nd:YVO$_4$ (205), YVO$_4$ (210), and KTP (215) components are illustrated. The exemplary laser comprises a Lyot filter that enables single mode operation. The Lyot filter can be modulated to sweep the wavelength and operate the multi-wavelength Raman spectroscopy set up.

In other embodiments, a dual laser setup may be used, for example with a green laser and a red laser. In some embodiments, both lasers may be modulated for producing multiple wavelengths, or the two lasers may be used in conjunction to enable Raman spectroscopy based on the difference of two Raman spectra taken at each wavelength of each laser. In some application this simpler technique may be useful, however it doubles the noise associated with the Raman signal, due to the difference operation.

Figure 3:
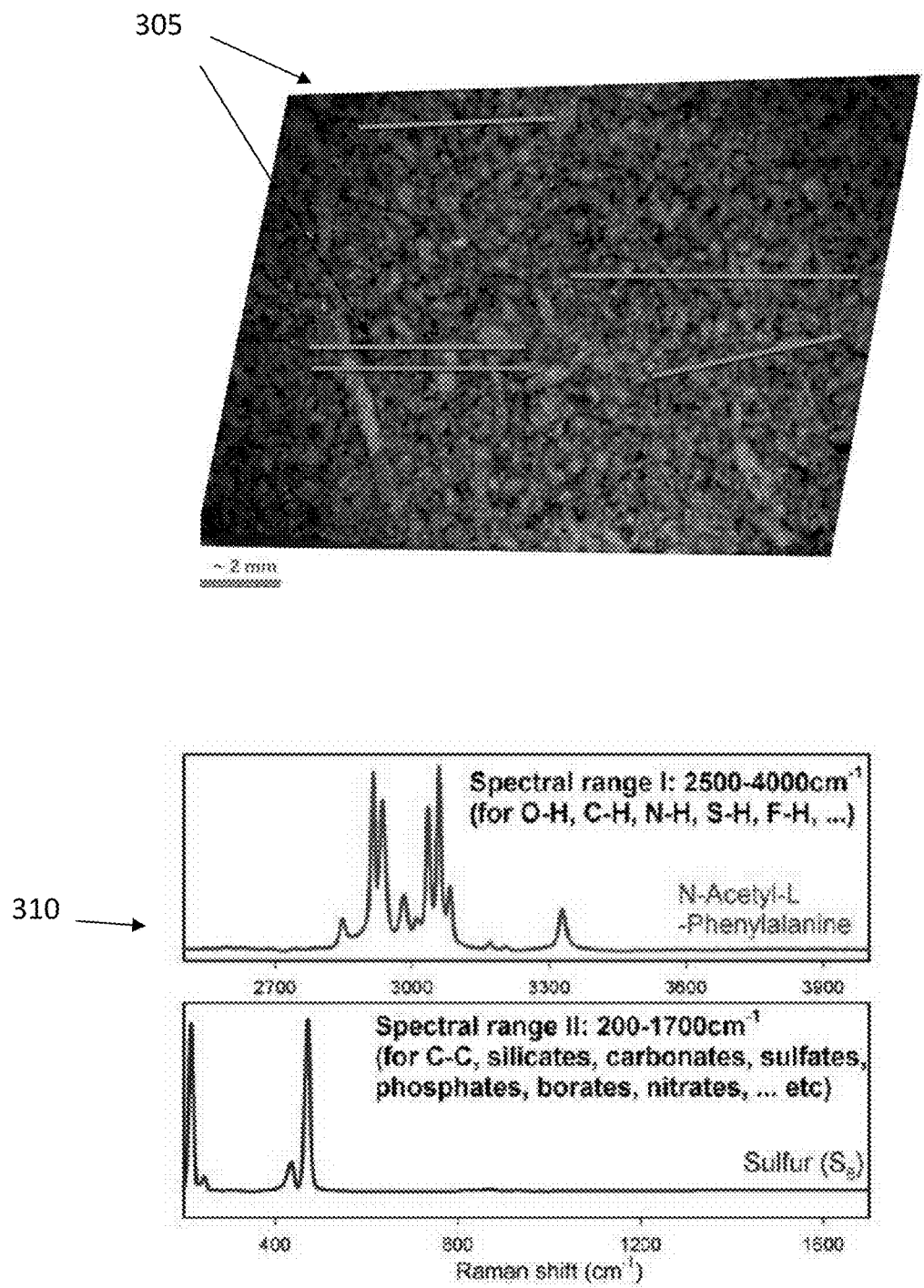
FIG. 3 depicts exemplary measurements in a line across a sample.

FIG. 3 illustrates an exemplary Raman spectrometer operation, with a line scanning method. A point counting methodology is illustrated, for characterizing rock samples using a dual-band multiplexed holographic transmission grating. Measurements are taken along a line (305). Exemplary results are plotted (310).

Figure 4:
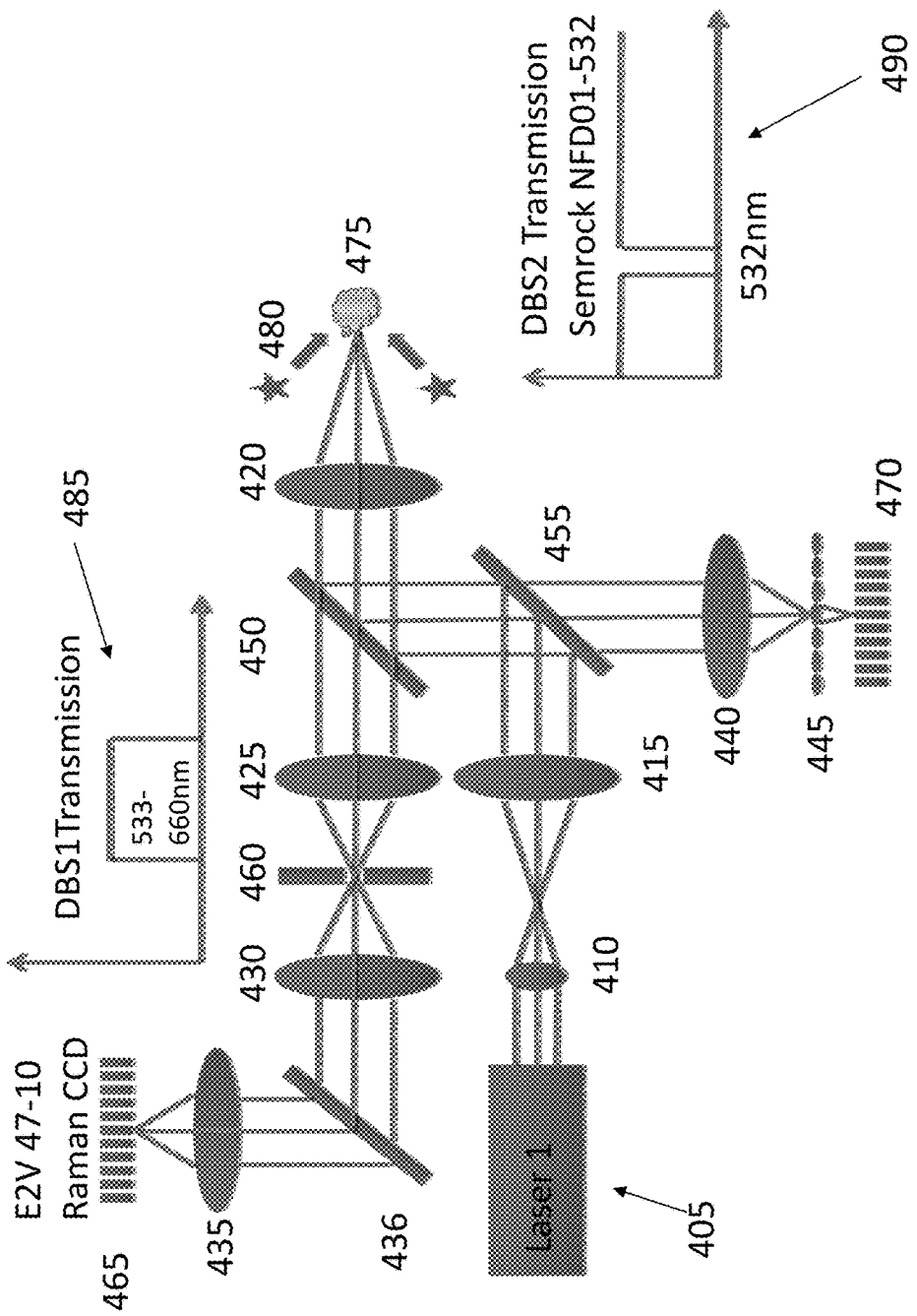
FIG. 4 illustrates an exemplary Raman and context imaging set up.

According to the present disclosure, FIG. 4 illustrates an exemplary optics set up for a Raman spectrometer with light field imaging. Light field imaging can provide, in some embodiments, a greater that 6×increase in depth of field with the same f number. The Raman microbeam spectrometer can operate without autofocus. Different embodiments may comprise changes in the optics set up, for example a lens may be a single lens or comprise a plurality of smaller lenses to accomplish a similar function.

In FIG. 4, a laser (405), such as a frequency doubling green laser, is the source of light. The laser beam is expanded through a first (410) and second (415) lenses. The expansion of the beam allows greater focusing onto the sample (475). The beam will be larger at the sample (475) if the beam exiting the laser (405) is less expanded by lenses (410) and (415). In other words, the bigger the beam is at lens 415), the smaller the beam will be at lens (420). The laser beam is reflected by a first dicroic beam splitter (DBS, 455). The transmission spectrum for the splitter (455) is illustrated in (490). A narrow band around the green laser wavelength of 532 nm is reflected by the splitter (455). The person of ordinary skill in the art will understand that if the wavelength of the laser is changed from 532 nm, the optics characteristics would be adjusted accordingly, for example by adjusting the reflection band in the splitter (455) according to the wavelength of the laser (405).

Continuing from splitter (455), the laser light is reflected again at the second dicroic beam splitter (450). The transmission spectrum for the splitter (450) is illustrated in (485). The spectrum (485) allows the reflection of the laser at 532 nm to impinge on sample (475), while allowing transmission of the shifted Raman signal originating from the sample (475). Lens (420) both focuses the laser beam on the sample, and collects the measured signal off the sample. The shifter Raman signal then is transmitted through splitter (450) and lens (425). Continuing from lens (425), a split (460) can be used, and then another lens (430), with the Raman signal continuing through a multiplexed holographic grating (436) to be focused by a lens (435) onto a CCD (465). The grating (436) and lens (435) can be adjusted in order to have a wavelength separation spatially separated onto the size of the CCD detector (465). The wavelengths can be spread out to adjust to the dimensions of the detector, so that sufficient resolution is achieved. In this way, not all wavelengths are concentrated onto the same pixel or spot in the detector, thereby increasing its resolution. The color dispersion is carried out through the grating (436). The spectral range is adjusted to the "length" of the detector. For example, the green light might be on one end of the detector, and the red light on the opposite end, with a graduation of wavelengths inbetween. A similar adjustment can be carried out for detector (470).

In some embodiments, an LED ring (480) can be present around the sample (475). The ring is made of LEDs that illuminate the sample. The wavelength of the LEDs light is different to that of the green excitation laser, for example with a shorter wavelength, such as 470 nm. The LED light collected from the sample through lens (420) is reflected by splitter (450), since it is at a shorter wavelength than its transmission band in (485). This LED light continues to splitter (455) to lens (440) which focuses the light onto a lenslet array (445) and then onto detector (470).

The lenslet array captures a light field image as described below. In some embodiments of the present disclosure, a plenoptics or light field camera can be used. As known to the person of ordinary skill in the art, a light field camera (or plenoptic camera) captures information about the intensity of light and also about the direction of the light. For example, a light field camera may use an array of microlenses placed in front of a conventional image sensor to sense intensity, wavelength, and directional information. Other light field cameras can comprise a multi-camera array. By using a light field camera to image a sample, it is possible to obtain an image that stores information to be used at a later time. For example, if at a later time it may be necessary to focus on a certain part of the image, the image captured with a light field camera can enable that.

In some embodiments, the light field camera can be combined with the Raman spectroscopy set up described above, in order to store the Raman signal of a sample and focus on different parts of the sample at a later time. An advantage of a light field camera combined with the multi-wavelength is the possibility of enabling Raman spectroscopy without moving parts. In this embodiment, the focus of the Raman spectroscopy image is on the whole sample, such as a rock. Multiple planes are captured through the use of software, enabling focusing on different parts of a sample, such as a rock, at a later time. In this way, data captured in the past can be analyzed again in future for purposes that were not determined at the time of capture. The data can thus be more useful in the long term.

In some embodiments, the Raman signal is captured with a center focus through detector (465), while the lenslet array captures the LED light through detector (470). The use of an array of lenslet allows the capture of an image with a greatly increased depth of field. Each lenslet of the array captures a portion of the total image. The images from each lenslet can be combined to obtain a total image of the sample. This total image can be focused on different portions of the sample by manipulation of the different image components captured by each lenslet.

For example, the image may be focused on the top right part of the sample, and at a subsequent time the image may be refocused on the bottom right part of the sample. This technique is possible thank to the depth of field captured by the lenslet array compared to the limited depth of field captured by a single lens. The single lens will necessarily limited to a certain depth of field, reduced compared to that captured by a lenslet array.

The array of lenslets can be customized to allow the implementation of different light fields. For example, in one type of light field, the lenslets have a diameter of about 30 micrometers, for example between 20 and 50 micrometers. This type of array may be susceptible to vignetting, but for most types of application, such as rock imaging, this downside is not too important. The advantage of this type of light field is the increased light capture efficiency, and increased depth of field, with an acceptable decrease in resolution.

A second type of light field employs lenslet of increased diameter, such as 250 micrometers, for example between 240 and 260 micrometers. This second type of light field has an increased resolution compared to the first type of light field with smaller diameter lenslets. The array of lenslets, in both types, comprises a plurality of lenslet adjacent to each other, to cover a plane sufficient to capture the light incoming from the remaining optical elements. The lenslet array can be termed a context imager. The context imager forms a composite image with the light information collected by each lenslet in the array. The context imager allows demagnetification of a sample image, and a subsequent increase in depth of field.

Figure 8:
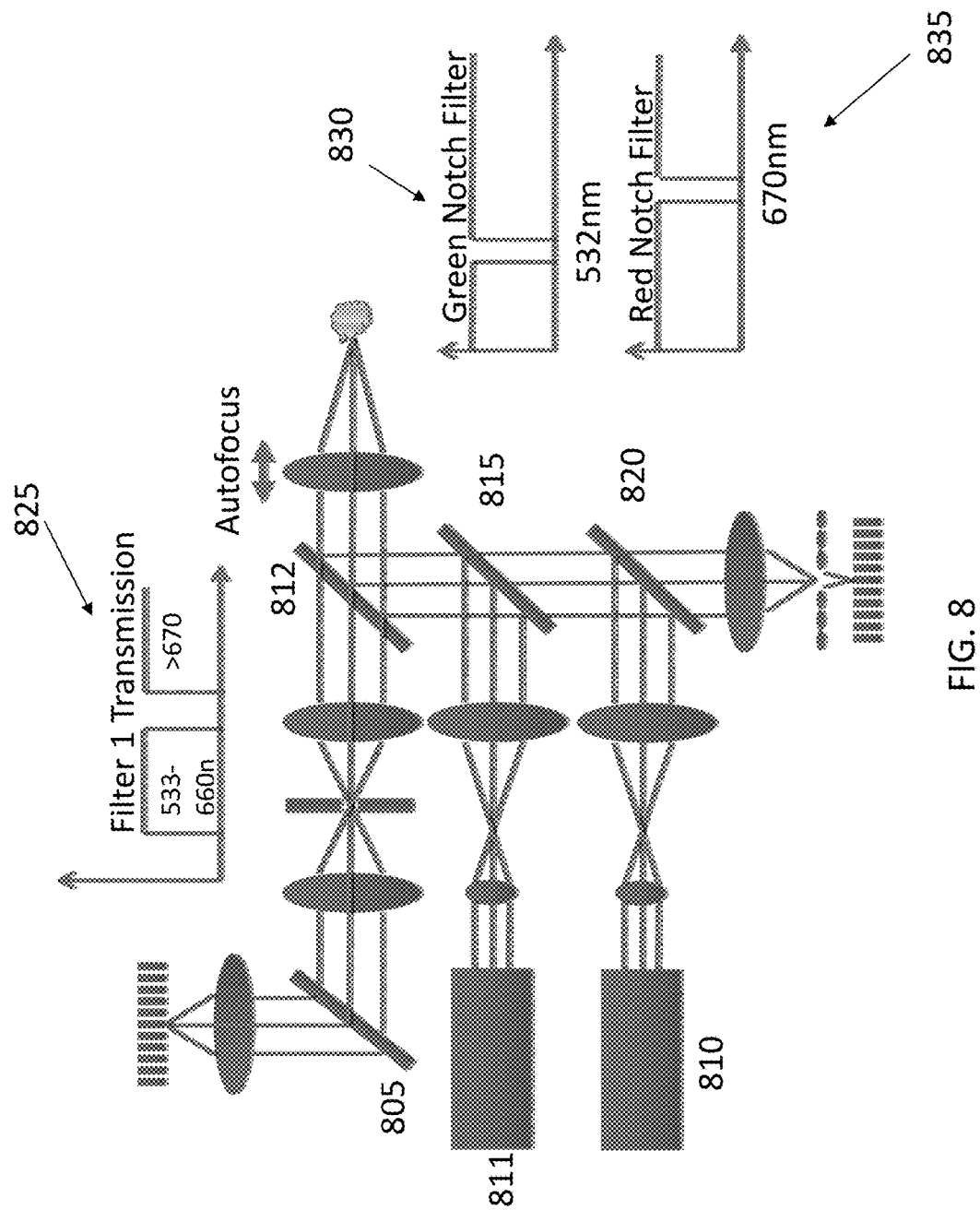
FIG. 8 illustrates an exemplary Raman and context imaging set up with two lasers.

FIG. 8 illustrates an embodiment alternative to that of FIG. 4. The optical elements of FIG. 8 are similar to those of FIG. 4 and their description is not repeated as it will be readily understood by the person of ordinary skill in the art. Differences comprise the use of an additional, second laser (810) for the implementation of SERDS. For example, laser (810) will be in red light, while the other laser (811) would be in green light. In some embodiments, one or both of the lasers can be modulated in wavelength as described above in the present disclosure, to allow multi-wavelength techniques more complex than the simple SERDS technique.

To collect Raman signals in this embodiment a triplexed holographic grating (805) can be used. The filters used in this embodiment comprise filters (812, 815, 820), whose transmission bands can be adjusted according to the wavelength of the excitation lasers. For example, for a green laser with a wavelength of 532 nm and a red laser with a wavelength of 670 nm, filter (812) can have the transmission band (825), which reflects both excitation wavelengths. Filter (815) can have the transmission band (830), which allows reflection of the green light, and filter (820) can have the transmission band (835), which allows reflection of the red light. In some applications, using only green light can be disadvantageous since the fluorescence signal may be very intense. In this cases, the use of a second laser, such as a red laser, may allow the removal of the fluorescence signal.

As known to the person of ordinary skill in the art, the Raman interaction leads to two possible outcomes: the material absorbs energy and the emitted photon has a lower energy than the absorbed photon (Stokes Raman scattering), or the material loses energy and the emitted photon has a higher energy than the absorbed photon (anti-Stokes Raman scattering). At low temperatures, Stokes scattering is predominant and may be at a wavelength of 535-675 nm with a 532 nm excitation wavelength.

As known to the person of ordinary skill in the art, geological samples are best analyzed using green excitation. However, due to high levels of laser induced fluorescence (LIF) often encountered using visible wavelength laser excitation, organic compounds are generally best identified using near-infrared Raman excitation. In some embodiments, a dual laser setup can be employed, for example with a green laser at 532 nm and a laser at 785 nm.

Since LIF and Raman spectra frequently occur together in mineral samples, shot noise associated with a strong LIF spectral background can overwhelm weaker Raman peaks. To deal with Raman-confounding LIF, a dual laser set up can employ two strategies: (1) use of a longer excitation wavelength laser (785 nm) whose photons often have insufficient energy to induce the electronic excitation necessary to produce LIF and (2) the use of lasers that can be step tuned (over 1-2 nm) about their nominal (532 nm or 785 nm) operating wavelengths.

Serially shifted excitation (SSE) of the laser wavelength produces corresponding wavelength shifts in the Raman spectra with respect to shift-invariant LIF spectra. The set of excitation wavelengths used, together with the sample spectra collected at each shift, may be expressed as a linear system of equations. These can be solved for the pure Raman and fluorescence components. Shot noise from LIF is mathematically removed from the Raman component and lumped with the LIF component.

Since the dual laser set up as described above in the present disclosure uses low power CW laser excitation, thermal heating effects are minimized over any Raman system using pulsed light to deliver the equivalent amount of energy to the sample over the same time period. Unlike Raman architectures using UV laser excitation, the dual laser set up uses visible and NIR excitation to provide photons with energies below the binding energies of most organic molecules thereby preventing sample degradation. Thus the dual laser set up represents a Raman instrument with broad utility that bridges the gap between instruments best suited for geologically or astrobiologically-based investigations. Each of the dual lasers may be step tuned to vary their wavelength and allow serially shifted excitation and correspondingly shifted Raman spectra.

As described above, if the excitation frequency of the laser is shifted slightly, the Raman active vibrational modes of the sample remain unchanged, so the absolute frequencies of the Raman scattered light will shift as well. The situation with fluorescence is markedly different. Fluorescence of a molecule with appreciable yield nearly always occurs at the lowest excited state. Consequently if the excitation wavelength changes slightly and the sample is fluorescing, the spectrum will essentially remain unchanged.

Serially shifted excitation (SSE) is derived from shifted excitation Raman difference spectroscopy (SERDS). SERDS simply involves subtracting an initial raw laser excitation spectra from another raw spectra acquired at a slightly shifted wavelength. The fluorescence from each acquisition subtract to zero, while a derivative-like Raman difference spectra is preserved. The Raman spectra can be recovered from the SERDS pseudo-derivative Raman spectrum though the use of curve fitting, Fourier deconvolution, or discrete integration. However curve-fitting is limited to simple spectra, deconvolution can amplify noise, and discrete integration can lead to a broadening of the Raman features and a sloping baseline. While SERDS can be employed in situations where fluorescence is not too severe, shot noise inherent in the fluorescence spectral component is equal to the square root of the number of photons collected within each of the spectrometer's spectral resolution bands. Therefore if a Raman peak of interest is smaller than the square root of the number of photons of the fluorescence spectrum in the corresponding spectral band, no meaningful recovery of the peak can be produced by employing SERDS.

The operating principals of SSE are based on observing changes that occur to the raw acquired spectra when the excitation frequency is increased incrementally by the same offset, in serial fashion. Mathematically the set of raw spectra acquired will contain sequentially shifted Raman components each summed with an un-shifted fluorescence spectral component.

Rather than using just two excitation frequencies like SERDS, the SSE methodology uses K excitation frequencies (K≥3) to collect and then process K raw spectra to "solve" for the individual LIF and Raman spectral components within the raw spectrum. Recognizing that the Raman components within the raw spectrum acquired will be shifted in frequency the same amount as the laser, and that the fluorescence components will all be shift invariant, allows the problem to be formulated in terms of the linear algebraic equation HS=R, where S is the solution vector containing the desired fluorescent and Raman components and R contains the set of acquired raw spectra collected at each of the K−1 shifts in laser excitation frequency, and H is an operator matrix. The elements of H consist of entirely zeros and ones in the form of partitioned square submatrices. The submatrices of H multiply the Raman and fluorescence solution vector elements such that they map and sum with the appropriate frequency shift in direct correspondence with those components contained (but hidden) inside the set of acquired raw spectra in R. An expectation-maximization solution can be found, as described by McCain at al. (cited above). SSE (unlike SERDS) always provides better signal to noise ratio when compared to conventional Raman for a given energy of exposure to the sample.

An improved algorithm is described by Cooper et al. Cooper J, et al., "Sequentially shifted Raman spectroscopy: Novel algorithm and instrumentation for fluorescence-free Raman spectroscopy in spectral space", Applied Spectroscopy 67 (8), pp. 973-984, 2013, the disclosure of which is incorporated herein by reference in its entirety. Cooper's optimized algorithm requires estimates of the Raman and fluorescence spectra to initialize the algorithm. The initial estimate of the Raman signature is obtained by taking the maximum of the SSE spectra collected since this enhances the peaks within the ensemble which are presumed to be Raman peaks for purposes of this initial guess. Similarly the initial estimate of the fluorescence signature is obtained by taking the minimum of the SSE spectra collected.

One large advantage of SSE over SERDS is in reduction/elimination of shot noise in the Raman component. Shot noise with SERDS actually increases by a factor of the square root of 2 over the raw signal. With SSE, shot noise does not shift as the laser frequency is changed, and therefore its contribution is mapped into the fluorescence component.

In some embodiments, a monolithic AlGaAs quantum well laser can be used for generating a tunable light source in the 785 nm regime. This laser can incorporate a monolithic distributed Bragg reflector into its structure in a hermetically sealed package. In some embodiments, the intracavity KTP crystal of the green laser described above provides a convenient tool for temperature tuning the laser based on the Lyot filter effect for implementing both SERDS and SSE methods.

FIG. 9 illustrates an exemplary LED ring as discussed above with reference to FIG. 4. In some embodiments, LEDs may have a wavelength of 470 nm (905) and comprise filters. This set up can allow Raman and context images to be collected at the same time. In some embodiments, additional LEDs may have a different wavelength, such as 275 nm (910)—these LEDs may also comprise filters. A slit holder (915) may also be part of the optical elements. In some embodiments, the slit holder may be positioned at the probe head site for a more robust performance. The sample position (920) is also illustrated. Other embodiments may comprise LEDs in a different number and position. In some embodiments, the dual length LED illumination system, comprising LEDs at two different wavelengths, may translate with the context imager and Raman fore optics.

In some embodiments, the green laser has a wavelength of 532 nm, and the second laser has a wavelength between 660 nm and 790 nm. In some embodiments, the LED light is smaller than 532 nm, for example between 450 and 250 nm.

A number of embodiments of the disclosure have been described. Nevertheless, it will be understood that various modifications may be made without departing from the spirit and scope of the present disclosure. Accordingly, other embodiments are within the scope of the following claims.

The examples set forth above are provided to those of ordinary skill in the art as a complete disclosure and description of how to make and use the embodiments of the disclosure, and are not intended to limit the scope of what the inventor/inventors regard as their disclosure.

Modifications of the above-described modes for carrying out the methods and systems herein disclosed that are obvious to persons of skill in the art are intended to be within the scope of the following claims. All patents and publications mentioned in the specification are indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

What is claimed is:

1. A device comprising:
a first laser to emit a first laser light at a first wavelength;
a plurality of LEDs to emit LED light at a second wavelength different from the first wavelength;
a plurality of optical elements to convey the first laser light from the first laser onto a sample and collect a Raman shifted light and the LED light from the sample;
a Raman detector to collect the Raman shifted light; and
a context imager detector to collect the LED light,
wherein:
the first laser is a frequency doubling green laser comprising a birefringent crystal to modulate the first wavelength,
the birefringent crystal is a Lyot filter,
the plurality of optical elements comprises:
first, second, third, fourth, fifth, sixth and seventh lenses;
first and second dicroic beam splitters;
a multiplexed holographic grating;
a split;
first and second detectors; and
a lenslet array,
the first and second lens are to transmit the first laser light from the first laser to the first dicroic beam splitter,
the first dicroic beam splitter is to reflect the first laser light to the second dicroic beam splitter and transmit the LED light from the second dicroic beam splitter to the seventh lens,
the second dicroic beam splitter is to reflect the first laser light from the first dicroic beam splitter to the third lens and transmit the Raman shifted light from the third lens to the fourth lens,
the third lens is to focus the first laser light from the second dicroic beam splitter to the sample and collect the Raman shifted light from the sample,
the fourth lens is to transmit light through the split to the fifth lens,
the multiplexed holographic grating is to refract the Raman shifted light from the fifth lens to the sixth lens,
the sixth lens is to focus the Raman shifted light onto the Raman detector,
the seventh lens is to focus the LED light onto the lenslet array, and
the lenslet array is to focus the LED light onto the context imager detector.

2. The device of claim 1, wherein the lenslet array comprises lenslets having a diameter between 20 and 40 micrometers.

3. The device of claim 1, wherein the lenslet array comprises lenslets having a diameter between 240 and 260 micrometers.

4. The device of claim 2, wherein the Raman detector is a charged coupled device.

5. The device of claim 4, wherein at least one of the first, second, third, fourth, fifth, sixth and seventh lenses comprises a plurality of composite lenses.

6. The device of claim 4, further comprising a second laser to emit a second laser light at a third wavelength different from the first and second wavelengths.

7. The device of claim 6, wherein the second laser is a red laser.

8. The device of claim 7, wherein the first wavelength is 532 nm, the second wavelength is between 450 and 250 nm, and the third wavelength is between 660 nm and 790 nm.

9. The device of claim 8, further comprising a heater to control a temperature of the Lyot filter, thus modulating the wavelength of the first laser.

10. A method comprising:
emitting a first laser light at a first wavelength by a first laser, the first laser being a frequency doubling green laser comprising a birefringent crystal to modulate the first wavelength;
emitting LED light at a second wavelength different from the first wavelength by a plurality of LEDs;
by a plurality of optical elements, conveying the first laser light from the first laser onto a sample and collecting a Raman shifted light and the LED light from the sample;

detecting the Raman shifted light by a Raman detector;
detecting the LED light by a context imager detector;
sweeping the first wavelength through a wavelength range in a plurality of first wavelength steps, by modulating the birefringent crystal in the first laser;
detecting the Raman shifted light at each wavelength step; and
deriving a Raman spectrum for the sample from the detected Raman shifted light at each wavelength step, wherein:
the birefringent crystal is a Lyot filter,
the plurality of optical elements comprises:
  first, second, third, fourth, fifth, sixth and seventh lenses;
  first and second dicroic beam splitters;
  a multiplexed holographic grating;
  a split;
  first and second detectors; and
  a lenslet array,
the first and second lens are to transmit the first laser light from the first laser to the first dicroic beam splitter,
the first dicroic beam splitter is to reflect the first laser light to a second dicroic beam splitter and transmit the LED light from the second dicroic beam splitter to the seventh lens,
the second dicroic beam splitter is to reflect the first laser light from the first dicroic beam splitter to the third lens and transmit the Raman shifted light from the third lens to the fourth lens,
the third lens is to focus the first laser light from the second dicroic beam splitter to the sample and collect the Raman shifted light from the sample,
the fourth lens is to transmit light through the split to the fifth lens,
the multiplexed holographic grating is to refract the Raman shifted light from the fifth lens to the sixth lens,
the sixth lens is to focus the Raman shifted light onto the Raman detector,
the seventh lens is to focus the LED light onto the lenslet array, and
the lenslet array is to focus the LED light onto the context imager detector.

11. The method of claim 10, further comprising emitting, by a second laser, a second laser light at a third wavelength different from the first and second wavelengths.

12. The method of claim 11, wherein detecting the Raman shifted light comprises taking a difference between a Raman spectrum detected while emitting first laser light and a Raman spectrum detected while emitting the second laser light.

13. The method of claim 11, further comprising:
sweeping the third wavelength through a wavelength range in a plurality of third wavelength steps, by modulating a birefringent crystal in the second laser;
detecting the Raman shifted light at each third wavelength step; and
deriving a Raman spectrum for the sample from the detected Raman shifted light at each first and third wavelength step.

14. The method of claim 10, wherein the first wavelength is 532 nm.

15. The method of claim 13, wherein the first wavelength is 532 nm, the second wavelength is between 450 and 250 nm, and the third wavelength is between 660 nm and 790 nm.

16. The method of claim 10, further comprising focusing an image of the sample at a desired point of the sample by processing the LED light captured by the lenslet array.

17. A device comprising:
a first laser to emit a first laser light at a first wavelength;
a plurality of LEDs to emit LED light at a second wavelength different from the first wavelength;
a plurality of optical elements to convey the first laser light from the first laser onto a sample and collect a Raman shifted light and the LED light from the sample;
a Raman detector to collect the Raman shifted light; and
a context imager detector to collect the LED light,
wherein:
the first laser is a frequency doubling green laser comprising a birefringent crystal to modulate the first wavelength,
the plurality of optical elements comprises:
  at least one lens;
  first and second dicroic beam splitters; and
  a lenslet array;
the first dicroic beam splitter is to reflect the first laser light to the second dicroic beam splitter and transmit the LED light from the second dicroic beam splitter to the at least one lens,
the at least one lens is to focus the LED light onto the lenslet array, and
the lenslet array is to focus the LED light onto the context imager detector.

* * * * *